US009537699B2

(12) United States Patent
Kenney et al.

(10) Patent No.: US 9,537,699 B2
(45) Date of Patent: *Jan. 3, 2017

(54) WIRELESS DEVICE AND METHOD FOR LOW POWER AND LOW DATA RATE OPERATION

(71) Applicant: Intel Corporation, Santa Clara, CA (US)

(72) Inventors: Thomas J. Kenney, Portland, OR (US); Eldad Perahia, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/719,733

(22) Filed: May 22, 2015

(65) Prior Publication Data
US 2015/0365265 A1 Dec. 17, 2015

Related U.S. Application Data

(63) Continuation of application No. 13/993,287, filed as application No. PCT/US2011/061653 on Nov. 21, 2011, now Pat. No. 9,049,239.

(51) Int. Cl.
*H04J 11/00* (2006.01)
*H04L 27/26* (2006.01)
(Continued)

(52) U.S. Cl.
CPC ......... *H04L 27/2628* (2013.01); *H04L 5/0007* (2013.01); *H04L 5/0044* (2013.01); *H04L 27/2643* (2013.01); *H04L 69/22* (2013.01); *H04W 52/267* (2013.01); *H04W 84/18* (2013.01)

(58) Field of Classification Search
None
See application file for complete search history.

(56) References Cited

U.S. PATENT DOCUMENTS 9,049,239 B2  6/2015 Kenney et al.
2004/0042556 A1  3/2004 Medvedev et al.
(Continued)

FOREIGN PATENT DOCUMENTS

CN  101346959 A  1/2009
CN  102187613 A  9/2011
(Continued)

OTHER PUBLICATIONS

"3rd Generation Partnership Project, Technical Specification Group Services and System Aspects; IP flow mobilityand seamless Wireless Local Area Network (WLAN) of fload", Stage 2(Release 10), 3GPP TS 23.261 V10.1.0, [Online] retrieved from the internet: <Search date: Dec. 5, 2014, URL, http://www.http://www.3gpp.org/ftp/specs/archive/23_series/23.261/>, (Sep. 29, 2010), p. 6.
(Continued)

*Primary Examiner* — Duc C Ho
(74) *Attorney, Agent, or Firm* — Schwegman Lundberg & Woessner, P.A.

(57) ABSTRACT

Embodiments of a wireless device and method for transmitting a packet comprising one or more orthogonal frequency division multiplexed (OFDM) transmission symbols are generally described herein. In some embodiments, the wireless device may be configured to map data to active tones and map zeroes to nulled tones of a set of OFDM tones to generate an OFDM symbol comprising both the active and the nulled tones. The number of active and nulled tones may be based on a nulling factor. The OFDM symbol may be down-clocked to generate an OFDM transmission symbol for transmission over a reduced transmission bandwidth. Accordingly, low power may be used for very low data rate transmissions, which may be suitable for sensor devices.

30 Claims, 3 Drawing Sheets

(51) Int. Cl.
*H04L 5/00* (2006.01)
*H04W 52/26* (2009.01)
*H04L 29/06* (2006.01)
*H04W 84/18* (2009.01)

(56) References Cited

U.S. PATENT DOCUMENTS

| | | | |
|---|---|---|---|
| 2006/0034382 | A1 | 2/2006 | Ozluturk et al. |
| 2007/0147226 | A1 | 6/2007 | Khandekar et al. |
| 2007/0248179 | A1 | 10/2007 | Hassan et al. |
| 2008/0176523 | A1* | 7/2008 | Sutton ............... H04B 1/0475 455/76 |
| 2008/0311772 | A1 | 12/2008 | Osypka et al. |
| 2009/0052560 | A1 | 2/2009 | She et al. |
| 2009/0074094 | A1 | 3/2009 | Palanki et al. |
| 2009/0161783 | A1 | 6/2009 | Ozluturk |
| 2010/0316140 | A1 | 12/2010 | Razazian et al. |
| 2011/0096856 | A1 | 4/2011 | Sadowsky et al. |
| 2012/0257897 | A1* | 10/2012 | Hu ................... H04B 10/548 398/76 |
| 2014/0029681 | A1 | 1/2014 | Zhang et al. |
| 2014/0269770 | A1 | 9/2014 | Kenney et al. |

FOREIGN PATENT DOCUMENTS

| | | |
|---|---|---|
| EP | 1641308 A1 | 3/2006 |
| JP | 2008078790 A | 4/2008 |
| JP | 2008510376 A | 4/2008 |
| KR | 20070091855 A | 9/2007 |
| KR | 20080002706 A | 1/2008 |
| WO | WO-2008155307 A1 | 12/2008 |
| WO | WO-2013022468 A1 | 2/2013 |
| WO | WO-2013077838 A1 | 5/2013 |

OTHER PUBLICATIONS

"U.S. Appl. No. 13/993,287, Notice of Allowance mailed Jan. 14, 2015", 9 pgs.
"European Application Serial No. 11870676.1, Extended European Search Report mailed Feb. 19, 2015", 9 pgs.
"International Application Serial No. PCT/US2011/061653, International Preliminary Report on Patentability mailed Jun. 5, 2014", 6 pgs.
"International Application Serial No. PCT/US2011/061653, International Search Report mailed Apr. 10, 2012", 3 pgs.
"International Application Serial No. PCT/US2011/061653, Written Opinion mailed Apr. 10, 2012", 4 pgs.
"International Application Serial No. PCT/US2011/063301 Search Report mailed Jun. 28, 2012", 7 pgs.
"International Application Serial No. PCT/US2011/063301, International Preliminary Report on Patentability mailed Feb. 20, 2014", 7 pgs.
"International Application Serial No. PCT/US2011/063301, Written Opinion mailed Jun. 28, 2012", 5 pgs.
"Japanese Application Serial No. 2014-523908, Office Action mailed Dec. 16, 2014", 9 pgs.
"Korean Application Serial No. 2014-7005385, Notice of Final Rejection mailed Aug. 20, 2015", 6 pgs.
Heejung, Yu, et al., "Coverage Extension for IEEE802.11ah", IEEE 802.11-11/0035r1, (Jan. 2011); 2,3,5,6,10.
Minyoung, Park, "TGah use cases summary and aggregated PHY rates analysis; 11-11-0299-00-00ah-tgah-use-cases-summary-and-aggregated-phy-rates-analysis"; IEEE SA Mentor, 11-11-0299-00-00AH-TGAH-Use-Cases-Summary-and-Aggregated-PHY-Rates-Analysis vol. 802.11ah,, (Mar. 13, 2011), 1-11.
Park, Minyoung, et al., "Use Cases Summary and Aggregated PHY Rates Analysis", IEEE 802.11-11/0299r0, [Online] retrieved from the internet: <Search date: Dec. 5, 2014, URL, https://mentor.ieee.org/802.11/documentsis_dcn=Intel&is_group=00ah&is_year=2011>, (Mar. 13, 2011), pp. 7, 11.
Ron, Porat, "S1G Spectrum Regulations; 11-11-0685-00-00ah-s1g-spectrum-regulations", IEEE SA Mentor; 11-11-0685-00-00AH-S1G-Spectrum-Regu lations vol. 802.11ah, (May 7, 2011), 1-10.
"Chinese Application Serial No. 201180074970.0, Office Action mailed Jun. 13, 2016", Without English Translation, 11 pgs.
"Korean Application Serial No. 2014-7005385, Non Final Office Action mailed Feb. 17, 2015", W/English Translation, 14 pgs.

\* cited by examiner

WIRELESS DEVICE AND METHOD FOR LOW POWER AND LOW DATA RATE OPERATION

This application is a continuation of U.S. patent application Ser. No. 13/993,287, filed on Jun. 11, 2013, now issued as U.S. Pat. No. 9,049,239, which is a U.S. National Stage Filing under 35 U.S.C. 371 from International Application No. PCT/US2011/061653, filed on Nov. 21, 2011, and published in English as WO 2013/077838 on May 30, 2013, each of which is incorporated herein by reference in its entirety.

TECHNICAL FIELD

Embodiments pertain to wireless communications. Some embodiments relate to transmission of orthogonal frequency division multiplexed (OFDM) symbols. Some embodiments relate to low-power and low data rate wireless fidelity (Wi-Fi) type transmissions and wireless sensor networks. Some embodiments relate to OFDM devices that operate in accordance with an IEEE 802.11ah task group specification for low-power low data rate OFDM transmissions in the 1 GHz and lower frequency bands.

BACKGROUND

One issue with wireless data communication is power consumption, which is particularly an issue with battery-powered wireless devices, such as sensors. These wireless devices generally have a much lower data rate requirement than that provided by conventional IEEE 802.11n and IEEE 802.11ac configured devices. These wireless devices also may need to operate for extended periods on a battery, making IEEE 802.11n and IEEE 802.11ac configured devices less suitable for such applications due to their higher power consumption.

Thus, there are general needs for wireless devices and methods that can operate at a much lower data rate and with much lower power consumption than conventional IEEE 802.11n and IEEE 802.11ac configured devices. There are also general needs for wireless devices and methods that can operate at a much lower data rate and with lower power consumption that reuse conventional IEEE 802.11n and IEEE 802.11ac device circuitry. There are general needs for wireless devices and methods suitable for use as sensor devices and operating as part of sensor networks.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
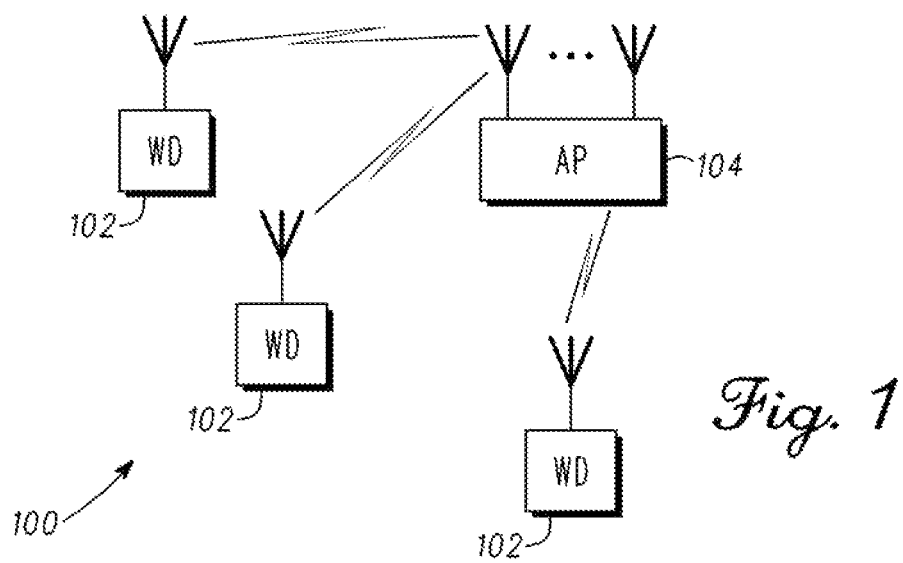
FIG. 1 illustrates wireless network, in accordance with some embodiments.

FIG. 1 illustrates a wireless network, in accordance with some embodiments. Wireless network 100 may include one or more wireless devices (WD) 102 and an access point (AP) 104 or base station. The AP 104 may be coupled to a network to allow communications between the wireless devices 102 and other entities. In some embodiments, the AP 104 may be coupled to the Internet or to a power-line network to provide data from the wireless devices 102 to a receiving entity. Wireless devices 102 may be low power devices that are configured to transmit low data rate data in accordance with an OFDM technique as described in more detail below. In some embodiments, the wireless network 100 may be a sensor network, and wireless devices may be sensor devices or sensor nodes that transmit sensor data. Although some embodiments are described with respect to sensor nodes and sensor networks, the scope of the embodiments is not limited in this respect and is applicable to almost any wireless network and any wireless communication device.

In accordance with embodiments, the wireless devices 102 may be configured for low data rate transmissions and operate at low power consumption levels. In these embodiments, the wireless devices 102 may substantially reuse the physical-layer of IEEE 802.11n and IEEE 802.11ac devices as described in more detail below. Some embodiments are applicable to the recently formed IEEE 802.11ah task group, which relates to an OFDM system operating in the 1 GHz and lower bands for low power and low data rate operations.

In accordance with some embodiments, a wireless device, such as one of wireless devices 102, may be configured for transmitting a packet comprising one or more OFDM transmission symbols. In these embodiments, a wireless device 102 may be configured to map data to active tones and map non-data (i.e., zeroes) to nulled tones of a set of OFDM tones to generate an OFDM symbol for transmission. The OFDM symbol may comprise both the active and the nulled tones. The number of active and nulled tones may be based on a nulling factor. In some of these embodiments, the wireless device 102 may down-clock the OFDM symbol for transmission over a reduced transmission bandwidth as compared with conventional IEEE 802.11 transmissions. In these embodiments, the nulling factor may be applied to transmit data on the active tones and to transmit non-data values of zero on the nulled tones, which may be transmitted over the reduced transmission bandwidth, although this is not a requirement. In some embodiments, the OFDM symbol may be transmitted at a transmission frequency of less than 1 GHz, although this is not a requirement.

In some embodiments, the wireless devices 102 may be part of an indoor or outdoor smart grid of sensors and may operate as part of a sensor service. An example of this type of service includes a metering service, which may provide meter data, such as gas, electricity or water usage data to a metering substation. In these embodiments, the wireless devices 102 may operate as sensor nodes and provide sensor data (e.g., meter readings) to the AP 104 or to a base station for routing to the metering substation or utility. Another example of a sensor service is patient monitoring for home healthcare, clinics or hospitals in which sensor nodes provide data for fall detection monitoring, pill bottle monitoring, weight monitoring, and heart monitoring. In these embodiments, the wireless devices 102 may operate as sensor nodes and provide related sensor data. This type of sensor service generally requires much lower data rates then that provided by more conventional IEEE 802.11n/ac systems, in addition to operating with ultra-low power consumption. In some embodiments, the sensor device may be coupled to a metering apparatus and may be configured to read sensor data from the metering apparatus, and transmit the sensor data at predetermined time intervals (i.e., once a week or month, or at a predetermined time of day). The transmission of the sensor data comprises transmission of a physical-layer service data unit (PSDU) comprising a plurality of OFDM transmission symbols. The sensor data may include physical (PHY) layer padding bits mapped to active tones of the OFDM transmission symbols, while zeros are mapped to nulled tones of the OFDM transmission symbols.

In accordance with embodiments, wireless devices 102 may be able to operate at a reduced the data rate, reduced transmission power, and reduced transmit PAPR, and may provide an improved battery life compared to a more conventional IEEE 802.11n/ac device. Wireless devices 102 may be able to meet the low power, low data rate, and increased battery life requirements of the IEEE 802.11ah task group. Some embodiments may allow minimal changes to devices that are configured in accordance with an IEEE 8021.11n/ac design.

In some embodiments, a wireless device 102 may a portable wireless communication device, such as a personal digital assistant (PDA), a laptop or portable computer with wireless communication capability, a web tablet, a wireless telephone, a wireless headset, a pager, an instant messaging device, a digital camera, an access point, a television, a medical device (e.g., a heart rate monitor, a blood pressure monitor, etc.), or other device or node that may transmit information wirelessly. The antennas used by wireless device 102 may comprise one or more directional or omni-directional antennas, including, for example, dipole antennas, monopole antennas, patch antennas, loop antennas, microstrip antennas or other types of antennas suitable for transmission of radio-frequency (RF) signals. In some embodiments, instead of two or more antennas, a single antenna with multiple apertures may be used. In these embodiments, each aperture may be considered a separate antenna. In some multiple-input multiple-output (MIMO) embodiments, antennas may be effectively separated to take advantage of spatial diversity and the different channel characteristics that may result between each of antennas 101 and the antennas of a transmitting station. In some MIMO embodiments, the antennas may be separated by up to 1/10 of a wavelength or more.

In some embodiments, the wireless device 102 may perform a carrier sense multiple access with collision avoidance (CSMA/CA) protocol for channel access including the exchange of a Request-to-Send (RTS) packet sent by the sender and a Clear-to-Send (CTS) packet sent by the intended receiver.

In some embodiments, wireless device 102 may include one or more of a keyboard, a display, a non-volatile memory port, a graphics processor, an application processor, speakers, and other mobile device elements. The display may be a liquid-crystal display (LCD) screen including a touch screen.

Figure 2:
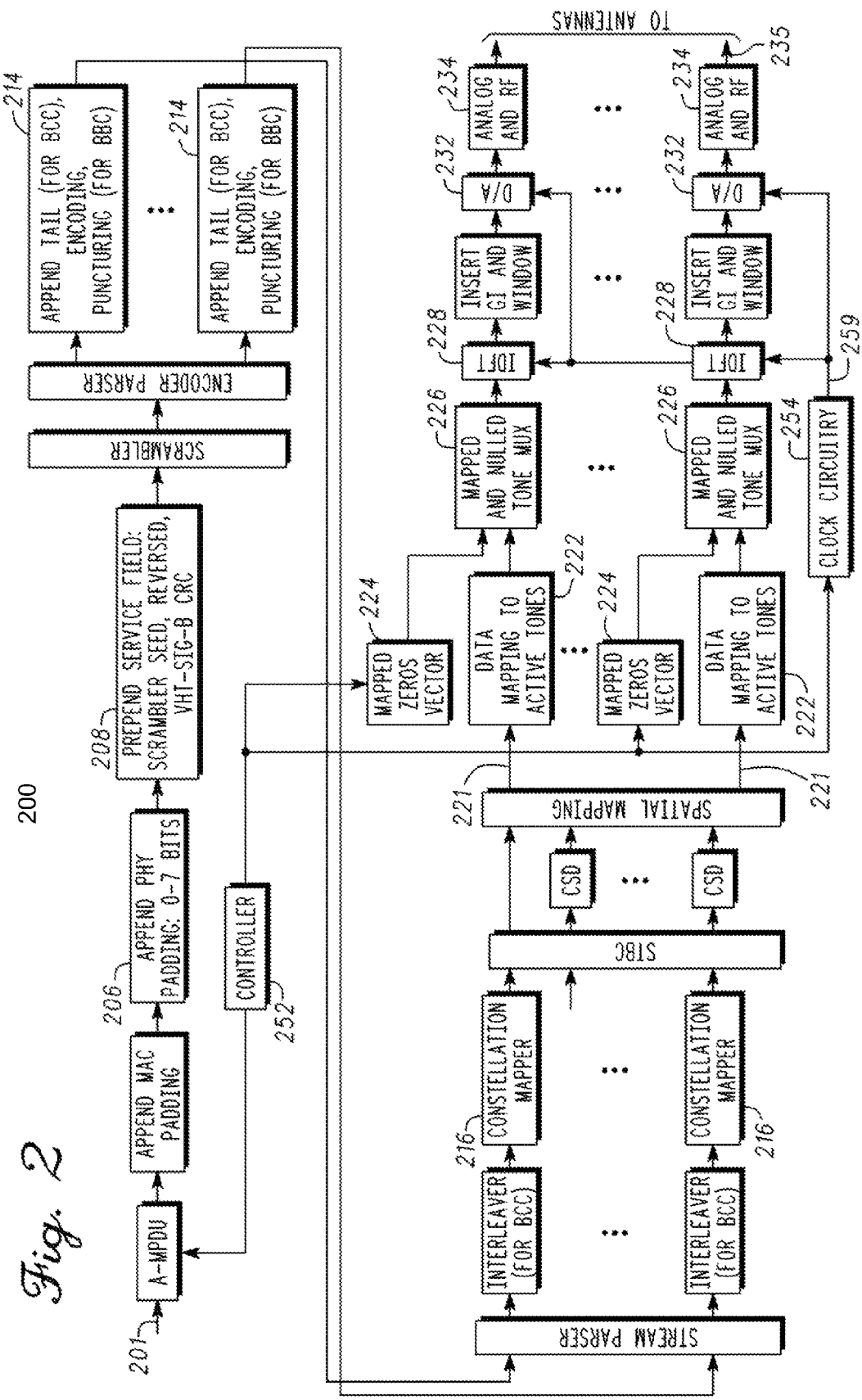
FIG. 2 is a functional block diagram of an OFDM transmitter, in accordance with some embodiments.

FIG. 2 is a functional block diagram of an OFDM transmitter, in accordance with some embodiments. Transmitter 200 may be configured to transmit one or more OFDM transmission symbols and may be configurable for low data rate transmissions and low power consumption. Transmitter 200 may be suitable for use as the PHY of a wireless device, such as one or more of the wireless devices 102 (FIG. 1). Wireless devices 102 may include other layer circuitry, including media-access control (MAC) layer circuitry, as well as receiver circuitry that are not illustrated. In general, the transmitter 200 may receive a MAC layer data unit (MPDU) 201 from a higher-level layer, may process the data unit, and generate an OFDM transmission symbol 235 for transmission by one or more antennas.

In accordance with embodiments, the transmitter 200 may include a data-mapping element 222 to map data 221 to active tones and a zero mapping element 224 to map non-data (i.e., zeroes) to nulled tones. The active tones and the nulled tones may comprise a set of OFDM tones. Transmitter 200 may also include a multiplexer 226 to multiplex the data that is to be mapped to the active tones with the non-data (i.e., zeroes) that are to be mapped to the nulled tones for performance of an inverse discrete Fourier transform (IDFT) by IDFT element 228. The IDFT element 228 may perform an IDFT, such as an inverse fast Fourier transform (IFFT), on the multiplexed data to generate a time-domain OFDM waveform having the data on the active tones and values of zero on the nulled tones. The number of active and nulled tones may be based on a nulling factor.

The transmitter 200 may also include a controller element 252 to configure the data mapping element 222 and configure the zero mapping element 224 based on the nulling factor. The controller element 252 may also be configured to perform other operations for transmission of an OFDM symbol comprising both the active and the nulled tones as described in more detail below.

In some embodiments, the OFDM waveform may be down clocked to generate an OFDM transmission symbol for transmission over/within a reduced transmission bandwidth. In these embodiments, the IDFT element 228 and a digital-to-analog (D/A) converter element 232 may operate at a down-clocked sample clock rate. The down clocking may be configured by the controller element 252 to provide a reduced transmission bandwidth compared to a more conventional IEEE 802.11n/ac configured transmitter. These embodiments are described in more detail below.

In some embodiments, the set of OFDM tones of the OFDM symbol that is transmitted by transmitter 200 comprises a predetermined number of tones. The number of active tones of the set and the number of nulled tones of the set may be determined based on the nulling factor. The OFDM symbol may be generated by performing an inverse Fourier transform (i.e., an IDFT of IFFT) on both the active and the nulled tones.

In these embodiments, the IDFT size may be based on the predetermined number of tones in the set, and the nulled tones may comprise tones of the set that are not active. The value of the nulled tones is forced to be zero prior to the IDFT processing. In some embodiments, the tones of the total set that comprise the OFDM symbol (e.g., both active and nulled) may be evenly spaced over the transmission bandwidth. Tone counts (i.e., the number of tones of the set), for both the data and nulled tones, may include 52, 108, 234, and 469 tones, each corresponding to a different transmission bandwidth.

In some embodiments, the nulling factor may indicate a portion of tones of the set of tones that are active. In these embodiments, the nulling factor may range from one to up to four or more. In some example embodiments, a nulling factor of one may indicate that all tones of the transmission bandwidth are active, a nulling factor of two may indicate that half tones of the transmission bandwidth are active, a nulling factor of three may indicate that a third of the tones of the transmission bandwidth are active, a nulling factor of four may indicate that a fourth of the tones of the transmission bandwidth are active, a nulling factor of five may indicate that a fifth of the tones of the transmission bandwidth are active, and so forth.

In some embodiments, the transmitter 200 may be configured to transmit a packet comprising one or more OFDM transmission symbols. The packet may be a PSDU comprising a plurality of OFDM transmission symbols. The data that is mapped to the active tones may be the data that is received from the MAC layer within the MPDU 201. In these embodiments, the controller element 252 may calculate a PSDU length based at least on the nulling factor, a size of the MPDU 201, and a number of OFDM symbols to be transmitted ($N_{SYM}$) as part of the PSDU. In these embodiments, the OFDM transmission symbols of the PSDU may include the active tones and the nulled tones, as well as pilot tones, guard tones, and a DC nulling tone. The PSDU length may be referred to as the PHY payload sized or the PSDU size. The PSDU length may be the number of OFDM transmission symbols of the PSDU.

In some embodiments, the controller element 252 may calculate a number of PHY padding bits based on a PSDU length and may configure element 206 to add the calculated number of padding bits to the MPDU for subsequent generation of the PSDU. The PSDU may be mapped to the active tones by the data-mapping element 222. In these embodiments, the entire PSDU, including the padding bits, may be considered data 221 that is mapped to the active tones for subsequent transmission.

In some embodiments, the controller element 252 may be configured to instruct element 208 to include the nulling factor in a signaling field of a header or preamble of the PSDU. In some embodiments, the signaling field may include two bits to indicate the nulling factor to the receiver. The signaling field may be added by element 208. The inclusion of the nulling factor in the PSDU allows the receiver (e.g., an access point or base station) to know which tones of the OFDM transmission are active for the extraction of the data from those tones. The use of an indication in the signaling field as part of a preamble structure may be used to make the AP 104 aware that a low power device (i.e., a wireless device 102) is using a nulled transmission. The use of two bits may allow nulling factors of up to six to be indicated.

In some alternate embodiments, the nulling factor is not indicated to the receiver. In these alternate embodiments, the receiver may be configured to perform blind detection and integrate energy received in both active and inactive tones to identify the active tones.

In some embodiments, the nulling factor may be received by transmitter 200 from the AP 104, while in other embodiments, the controller element 252 may select the nulling factor. In some embodiments, transmitter 200 may be pre-configured with a predetermined nulling factor based on the intended application for transmitter 200.

In some embodiments, when transmitter 200 is part of a transceiver, a configuration signal may be received from the AP 104 indicating the nulling factor. In these embodiments, the transmitter 200 may be configured to determine the number of active tones and the number of nulled tones based on the nulling factor, among other things. In these embodiments, the transmitter 200 may not need to signal the nulling factor to the AP 104 in the PSDU since it is known by the AP 104.

In some embodiments, a predetermined modulation and coding scheme (MCS) may be used by the transmitter 200. In some very-low data rate embodiments, the lowest-level MCS may be used. In some IEEE 802.11ac related embodiments, the lowest MCS may be BPSK modulation with a coding rate of ½. In these embodiments, element 214 of transmitter 200 may encode the data in accordance with the coding rate, and constellation mapper 216 may map the data to a signal constellation that is based on the modulation level (i.e., BPSK). The modulation level may determine the number of encoded bits that are mapped to each active tone.

In some embodiments, the time-domain signal that is transmitted by the transmitter 200 may have a transmission bandwidth based on the sample clock rate clock signal 259. The IDFT performed by IDFT element 228 may be performed based on the sample clock rate clock signal 259 and the digital-to-analog conversion performed by D/A converter element 232 on the time-domain signal may also be based on the sample clock rate clock signal 259 to generate an OFDM transmission symbol having a reduced transmission bandwidth. In these embodiments, the sample clock rate clock signal 259 may be a down-clocked sample clock rate configured to reduce the transmission signal bandwidth by a factor of ten or more. In some embodiments, the controller element 252 may configure clock circuitry 254 to down-clock the sample clock rate to generate a clock signal 259 having a down-sampled sample clock rate for use by IDFT element 228 and D/A converter element 232.

In accordance with some embodiments, the down clocking of the sample clock rate may be performed independent of the tone nulling. The use of a down-clocked sample clock of one-tenth, for example, may allow a 20 MHz waveform to fit within a 2 MHz transmission bandwidth. In these embodiments, the down clocking slows the transmitter's clocks down (in this example by 1/10) while increasing the OFDM symbol time without affecting the number of tones of each OFDM symbol. In the frequency domain, there is less bandwidth utilized and the tone spacing is closer. Tones, as used herein, may refer to subcarriers.

In these embodiments, a down-sampled sample clock rate of about one-tenth or one-twentieth the sample clock rate of a conventional wireless local area network (WLAN) (i.e., configured in accordance with IEEE 802.11n) may be provided to the IDFT element 228 and the D/A converter element 232 so that a significantly reduced transmission bandwidth compared to that of a conventional WLAN system may be used. In these embodiments, the D/A converter element 232 may sample at the down-sampled clock rate.

In these example embodiments, when the sample clock rate is down clocked by one-twentieth or one-tenth, a 20 MHz IEEE 802.11ac bandwidth that uses 52 tones may be reduced to either a 1 or 2 MHz bandwidth that uses 52 more closely-spaced tones; a 40 MHz IEEE 802.11ac bandwidth that uses 108 tones may be reduced to either a 2 or 4 MHz bandwidth that uses more closely-spaced 108 tones; an 80 MHz IEEE 802.11ac bandwidth that uses 234 tones may be reduced to either a 4 or 8 MHz bandwidth that uses more closely-spaced 234 tones; and a 160 MHz IEEE 802.11ac bandwidth that uses 468 tones may be reduced to either an 8 or 16 MHz bandwidth that uses more closely-spaced 468 tones, depending on the down sampling. In this way, IEEE 802.11n/ac transmitters may be used to transmit low data rate data over significantly narrower bandwidths using significantly less power. The use of a down-sampled clock rate may increase the OFDM symbol length in time.

In some embodiments, analog and RF circuitry 234 may be configured to up-convert the time domain signals from the IDFT element 228 to a transmission frequency of between 800 MHz and 1.0 GHz and amplify the signals at the transmission frequency with one or more power amplifiers. The time-domain signals for transmission generated by the IDFT element 228 comprise a plurality of tones (i.e., subcarriers) that are evenly spaced across the transmission bandwidth. The plurality of tones may include both the active and the nulled tones. In some embodiments, the active tones may be substantially evenly spaced across the transmission bandwidth, thereby allowing for a reduction in PAPR. In these embodiments, since only a portion of the total tones is active, the power amplifier may operate in a more linear region of operation with reduced power consumption. The reduction in active tones also provides for a reduction in power consumption since no energy (i.e., the zeroes) is transmitted on the nulled tones.

In some embodiments, the transmitter 200 may be configured for frequency selective transmission. In these embodiments, a transmission frequency of 1 GHz or less may be selected. In some alternate embodiments, the active tones may be selected based on channel conditions rather than being spaced out evenly across the transmission bandwidth. In these embodiments, the AP 104 may perform channel estimation and indicate to the transmitter 200 which tones should be used as active tones. In other embodiments, the transmitter 200 may perform a channel estimation to determine which tones to select as active tones.

In some example embodiments in which the sample clock rate is down-clocked by one-tenth, the transmission bandwidth may comprise a bandwidth of 2 MHz, 4 MHz, 8 MHz or 16 MHz using sets of 52, 108, 234 or 468 tones, respectively. In some other example embodiments in which sample clock rate is down-clocked by one-twentieth, the transmission bandwidth may comprise a bandwidth of 1 MHz, 2 MHz, 4 MHz or 8 MHz using sets of 52, 108, 234 or 468 tones, respectively. In some embodiments, the transmission bandwidth may be as little as 1 MHz or less and may be as large as 10 MHz or greater depending on the down clocking of the sample clock rate.

In some embodiments, the OFDM transmission symbols 235 generated by transmitter 200 may be transmitted through a single antenna. In these single-antenna embodiments, the transmitter 200 may include a single RF transmission chain, and the PHY layer processing elements may be configured for signal antenna and single stream transmissions.

In some other embodiments, more than one antenna may be used for transmission. In these embodiments, the transmitter may include an RF transmission chain for each antenna, and the PHY layer processing elements may be configured for generating more than one stream of data for multi-antenna transmissions. In some other embodiments, conventional IEEE 802.11n/ac circuitry may be used, which may include several RF transmission chains for multi-stream, multi-antenna, and MIMO transmissions. In these embodiments, one or more of the RF transmission chains may be turned off and the PHY layer processing may be configured by the controller element 252 to generate a single stream for transmission by a single antenna.

In some embodiments, the transmitter 200 may be part of a wireless sensor or sensor node, which may be battery-powered and may operate as part of a sensor network of one or more sensors. In some of these sensor embodiments, the transmitter 200 may use a single antenna for transmission of a single stream of sensor data for transmission over a reduced transmission bandwidth, although the scope of the embodiments is not limited in this respect.

In some embodiments, the active tones may be spread across the transmission band evenly to provide maximum frequency diversity. For static devices where the channel is stationary, the tones selected for nulling may be selected based on their relative signal-to-noise ratio (SNR). Active tones may be selected to avoid frequency bins, which are in a deep fade. The selection of tones may be signaled to the wireless device 102 by the AP 104 based on channel measurements by the AP 104 and provided as explicit feedback. The wireless device 102 may also be configured to measure received signals and select an active tone set (i.e., assuming reciprocity) based on those measurements.

In some embodiments, the PSDU length calculation and the calculation of the padding for the MAC and PHY data units may take into account the reduction in tones available for data. In some embodiments, the PSDU length may be calculated based on the following equation for binary convolutional coding:

$$\text{PSDU\_LENGTH} = \left\lfloor \frac{N_{SYM} N_{DBPS} / NF - N_{Service} - N_{Tail} N_{ES}}{8} \right\rfloor$$

or based on the following equation for LDPC coding:

$$\text{PSDU\_LENGTH} = \left\lfloor \frac{N_{SYM\_Max\_Init} N_{DBPS} / NF - N_{Service}}{8} \right\rfloor$$

Where,
$N_{SYM}$=Number of OFDM symbols to be transmitted
$N_{DBPS}$=Number of Data Bits per OFDM symbol
$N_{Service}$=Number of Service bits
$N_{ES}$=Number of Encoders (Convolutional)
$N_{Tail}$=Number of Tail Bits (Convolutional)

A similar expression may be used for computing the number of symbols in the above equations. As can be seen, the nulling factor (NF) term may be taken into account for the reduction in the number of data tones that are used.

In a conventional IEEE 802.11ac system when only one bit of data is to be transmitted, the lowest MCS would produce two symbols to be inserted at the input to the IFFT. The other tones are filled with padding symbols. Depending on the bandwidth configuration, 50, 106, 232 or 466 tones would therefore contain padding symbols since only two tones are used to transmit actual data. In this limited example, nearly all the transmit power is wasted on sending padding symbols, which are discarded at the receiver and provide no additional information. Some example embodiments may achieve up to a 75% reduction or more in power consumption with a nulling factor of four. Furthermore, reduction of the active tone count reduces the PAPR produced by the OFDM signal. Thus, based on the nulling factor, a reduction in power consumption for the power amplifier is attained since the signal can operate closer to the non-linear region of the device. This provides for an additional reduction in power consumption.

Although transmitter 200 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), radio-frequency integrated circuits (RFICs) and combinations of various hardware and logic circuitry for performing at least the functions described herein. In some embodiments, the functional elements of transmitter 200 may refer to one or more processes operating on one or more processing elements.

Embodiments may also be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the transmitter 200 may include one or more processors and may be configured with instructions stored on a computer-readable storage device.

Figure 3:
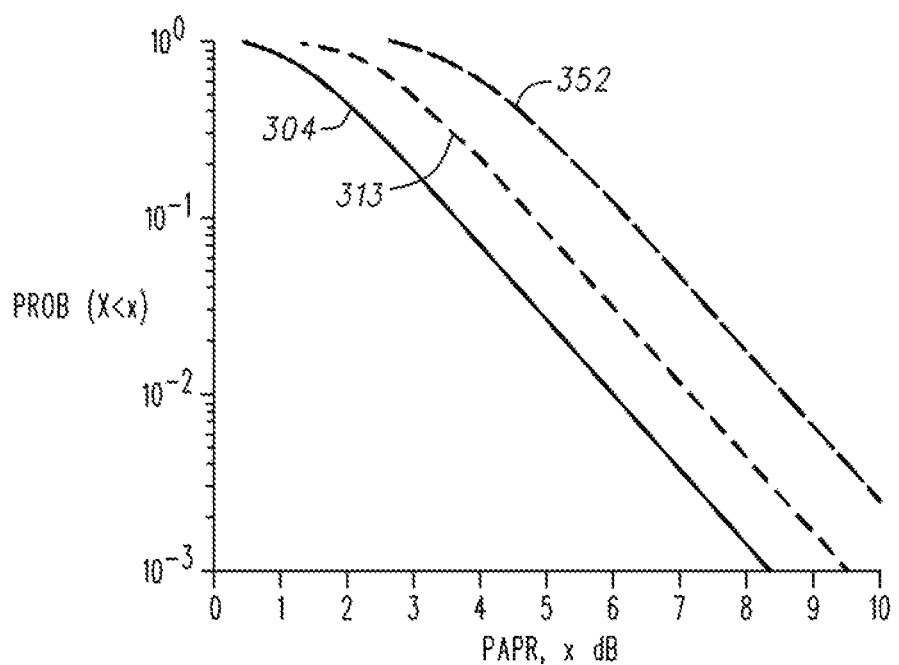
FIG. 3 illustrates a comparison of peak-to-average power ratio (PAPR) of OFDM waveforms with different numbers of tones, in accordance with embodiments.

FIG. 3 illustrates a comparison of PAPR of OFDM waveforms with different numbers of active tones, in accordance with embodiments. As illustrated in FIG. 3, the PAPR of OFDM waveforms with 4 active tones (waveform 304), 13 active tones (waveform 313) and 52 active tones (waveform 352) are illustrated. In this example, a nulling factor of four reduces the number of active tones from 52 active tones to 13 active tones and provides over a 1.5 dB PAPR advantage. Thus, not only is there a transmit power reduction directly proportional to the nulling factor, there is an additional PAPR reduction that allows for further reduction in the power consumption in the transmitter.

Although embodiments are described herein with a nulling factor being an integer value, the scope of the embodiments is not limited in this respect as any tone count could be nulled.

Unlike single carrier FDMA transmissions in a 3GPP long-term evolution (LTE) uplink, for example, in these embodiments, the OFDM transmission symbol is a multi-carrier OFDM signal even when only one of the tones is an active tone because the OFDM waveform includes both active and nulled tones. Furthermore, the OFDM transmission symbol may also include pilot tones, guard tones, and a cyclic prefix.

Figure 4:
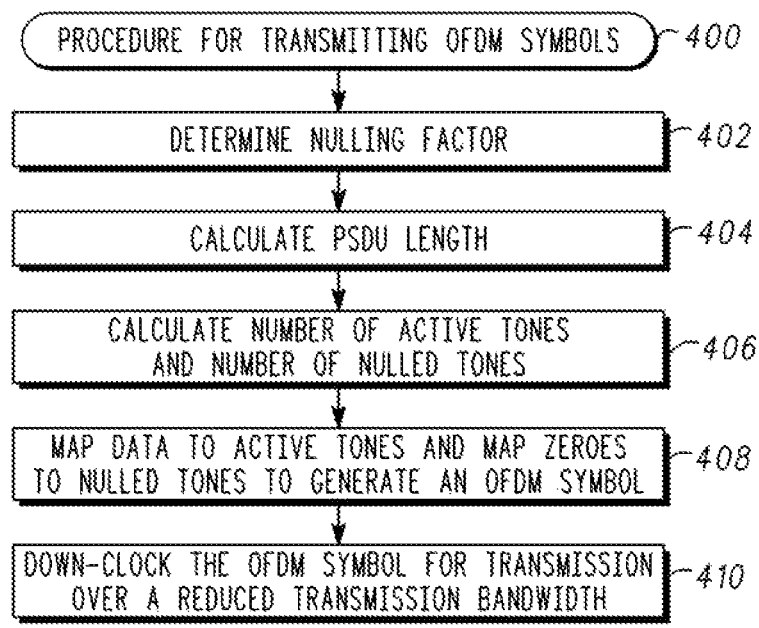
FIG. 4 illustrates a procedure for transmitting OFDM symbols, in accordance with some embodiments.

FIG. 4 illustrates a procedure for transmitting OFDM symbols, in accordance with some embodiments. Procedure 400 may be performed by a wireless device, such as wireless device 102, for low-power OFDM transmissions for low data rate data.

In operation 402, the nulling factor is determined As discussed above, it may be provided by the AP 104 (FIG. 2), it may be predetermined, or it may be determined by the wireless device 102.

In operation 404, the PSDU length is calculated based on the nulling factor, and a number of MAC and PHY padding bits are determined.

In operation 406, the number of active tones and the number of nulled tones is calculated based on the nulling factor. The number of active tones and number of nulled tones may be based on the total number of OFDM tones that is to be transmitted.

In operation 408, data is mapped to active tones and zeroes are mapped to nulled tones of the set of OFDM tones. An IDFT may be performed to generate an OFDM symbol comprising both the active and the nulled tones.

In operation 410, the OFDM symbol may be down-clocked to generate an OFDM transmission symbol with a reduced transmission bandwidth. The OFDM transmission symbol may be transmitted as part of the PSDU, a frame of data or a burst.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A non-transitory computer-readable storage medium that stores instructions for execution by one or more processors of a wireless device to configure the wireless device for transmission of a packet comprising one or more orthogonal frequency division multiplexed (OFDM) transmission symbols, the instructions to configure the wireless device to:
   map data to active tones and map zeroes to nulled tones of a set of OFDM tones to generate an OFDM symbol comprising both the active and the nulled tones, the number of active and nulled tones being based on a nulling factor; and
   generate a packet comprising one or more OFDM transmission symbol from the generated OFDM symbol for transmission over a transmission bandwidth.

2. The non-transitory computer-readable storage medium of claim 1, wherein the set of OFDM tones of the OFDM symbol comprises a predetermined number of tones; and
   wherein the number of active tones of the set and the number of nulled tones of the set is determined based on the nulling factor; and
   wherein the OFDM symbol is generated by performing an inverse Fourier transform on both active and the nulled tones.

3. The non-transitory computer-readable storage medium of claim 2, wherein the nulling factor indicates a portion of tones of the set of tones that are active; and
   wherein the OFDM transmission symbol further includes pilot tones, guard tones and a cyclic prefix.

4. The non-transitory computer-readable storage medium of claim 3, wherein the packet comprises a physical layer service data unit (PSDU), the PSDU comprising a plurality of OFDM transmission symbols,
   wherein the data that is mapped to the active tones is received as part of a media-access control (MAC) layer protocol data unit (MPDU); and
   wherein the instructions further configure the one or more processors to calculate a PSDU length based at least on the nulling factor, a size of the MPDU, and a number of OFDM symbols to be transmitted as part of the PSDU.

5. The non-transitory computer-readable storage medium of claim 4, wherein the instructions further configure the one or more processors to:
   calculate a number of padding bits based on a length of the PSDU; and
   add the calculated number of padding bits to generate the PSDU,
   wherein the data bits and the padding bits of the PSDU are mapped to the active tones and are not mapped to the nulled tones.

6. The non-transitory computer-readable storage medium of claim 5, wherein the instructions further configure the one or more processors to include the nulling factor in a signaling field of a header portion of the PSDU for use by a receiver in decoding the PSDU.

7. The non-transitory computer-readable storage medium of claim 5, wherein the instructions further configure the one or more processors to:
    receive a configuration signal from an access point indicating the nulling factor; and
    determine the number of active tones and the number of nulled tones based on the nulling factor.

8. The non-transitory computer-readable storage medium of claim 5, wherein the instructions further configure the one or more processors to:
    multiplex the data that is to be mapped to the active tones with the zeroes that are to be mapped to the nulled tones; and
    perform an inverse-discrete Fourier transform (IDFT) on the multiplexed data to generate a time-domain signal corresponding to the OFDM symbol having the data on the active tones and zeroes on the nulled tones.

9. The non-transitory computer-readable storage medium of claim 8, wherein to generate the OFDM transmission symbol, the wireless device is configured to down-clock the OFDM symbol to generate the OFDM transmission symbol for transmission over a reduced transmission bandwidth.

10. The non-transitory computer-readable storage medium of claim 9, wherein the time-domain signal has a transmission bandwidth based on a sample clock rate,
    wherein the instructions further configure the one or more processors to:
    perform the IDFT based on the sample clock rate; and
    perform a digital-to-analog conversion on the time-domain signal based on the sample clock rate to generate the OFDM transmission symbol having the transmission bandwidth,
    wherein the sample clock rate is a down-clocked sample clock rate configured to reduce the transmission signal bandwidth by a factor of ten or more.

11. The non-transitory computer-readable storage medium of claim 10, wherein the instructions further configure the one or more processors to configured the wireless device to:
    upconvert the time domain signals to a transmission frequency of between 800 MHz and 1.0 GHz; and
    amplify the signals at the transmission frequency with a power amplifier,
    wherein the time-domain signals for transmission generated by the IDFT comprise a plurality of tones that are evenly spaced across the transmission bandwidth, the plurality of tones comprising the active and the nulled tones.

12. The non-transitory computer-readable storage medium of claim 11, wherein the active tones are substantially evenly spaced across the transmission bandwidth allowing for a reduction in a peak-to-average power ratio (PAPR) of the signals for transmission.

13. The non-transitory computer-readable storage medium of claim 11, wherein when the sample clock rate is down-clocked by one-tenth, the transmission bandwidth comprises bandwidths of 2 MHz, 4 MHz, 8 MHz or 16 MHz using sets of 52, 108, 234 and 468 tones, respectively.

14. A non-transitory computer-readable storage medium that stores instructions for execution by one or more processors of a wireless device to configure the wireless device for transmission of one or more orthogonal frequency division multiplexed (OFDM) transmission symbols, the operations to configure the wireless device to:
    map data to active tones and map zeroes to nulled tones of a set of OFDM tones to generate an OFDM symbol comprising both the active and the nulled tones, the number of active and nulled tones being based on a nulling factor; and
    down-clock the OFDM symbol to generate an OFDM transmission symbol for transmission over a reduced transmission bandwidth.

15. The non-transitory computer-readable storage medium of claim 14, wherein the instructions further configure the wireless device to:
    multiplex data that is to be mapped to the active tones with the zeroes that are to be mapped to the nulled tones; and
    perform an inverse-discrete Fourier transform (IDFT) on the multiplexed data to generate a time-domain signal corresponding to the OFDM symbol having the data on the active tones and zeroes on the nulled tones.

16. The non-transitory computer-readable storage medium of claim 15, wherein the set of OFDM tones of the OFDM symbol comprises a predetermined number of tones,
    wherein the number of active tones of the set and the number of nulled tones of the set is determined based on the nulling factor; and
    wherein the OFDM symbol is generated by performing an inverse Fourier transform on both the active and the nulled tones.

17. The non-transitory computer-readable storage medium of claim 16, wherein the OFDM symbol is part of a physical layer service data unit (PSDU), the PSDU comprising a plurality of OFDM transmission symbols,
    wherein the data that is mapped to the active tones is received as part of a MAC layer protocol data unit (MPDU); and
    wherein the instructions further configure the one or more processors to calculate a PSDU length based at least on the nulling factor, a size of the MPDU, and a number of OFDM symbols to be transmitted as part of the PSDU.

18. The non-transitory computer-readable storage medium of claim 17, wherein the instructions further configure the one or more processors to:
    calculate a number of padding bits based on a length of the PSDU; and
    add the calculated number of padding bits to generate the PSDU,
    wherein data bits and the padding bits are mapped to the active tones and are not mapped to the nulled tones.

19. The non-transitory computer-readable storage medium of claim 18, wherein the instructions further configure the one or more processors to include the nulling factor in a signaling field of a header portion of the PSDU for use by a receiver in decoding the PSDU.

20. The non-transitory computer-readable storage medium of claim 14, wherein the wireless device is a sensor device configured to operate on battery power and configured to transmit sensor data comprising one or more OFDM transmission symbols, the sensor device configured to:
    map data to active tones and map zeroes to nulled tones of a set of OFDM tones to generate an OFDM symbol comprising both the active and the nulled tones, the number of active and nulled tones being based on a nulling factor; and
    down-clock the OFDM symbol to generate a multicarrier OFDM transmission symbol for transmission over a reduced transmission bandwidth.

21. The non-transitory computer-readable storage medium of claim 20, wherein the sensor device comprises an OFDM transmitter that is configured in accordance with an IEEE 802.11 standard to operate at the down-clocked sample clock rate.

22. The non-transitory computer-readable storage medium of claim 21, wherein the sensor device is coupled to a metering apparatus and is further configured to:
   read sensor data from the metering apparatus; and
   transmit the sensor data at predetermined time intervals,
   wherein the transmission of the sensor data comprises transmission of a physical layer service data unit (PSDU) comprising a plurality of OFDM transmission symbols,
   wherein the sensor data including padding bits are mapped to active tones of the OFDM transmission symbols and
   zeros are mapped to nulled tones of the OFDM transmission symbols.

23. The non-transitory computer-readable storage medium of claim 22 wherein the sensor device is further configured to transmit at a transmission frequency of between 800 MHz and 1.0 GHz, and
   wherein the reduced transmission bandwidth is no greater 2 MHz.

24. A wireless device for transmitting a packet comprising one or more orthogonal frequency division multiplexed (OFDM) transmission symbols, the wireless device comprising processing circuitry and transceiver circuitry configured to:
   map data to active tones and map zeroes to nulled tones of a set of OFDM tones to generate an OFDM symbol comprising both the active and the nulled tones; and
   down-clock the OFDM symbol to generate an OFDM transmission symbol for transmission over a reduced transmission bandwidth.

25. The wireless device of claim 24, wherein the wireless device is configured to perform an inverse-discrete Fourier transform (IDFT) based on a sample clock rate for transmission of the OFDM transmission symbol over the reduced transmission bandwidth.

26. The wireless device of claim 25 wherein the wireless device is configured to:
   multiplex the data that is to be mapped to the active tones with the zeroes that are to be mapped to the nulled tones; and
   perform the IDFT on the multiplexed data to generate a time-domain signal corresponding to the OFDM symbol having the data on the active tones and zeroes on the nulled tones.

27. The wireless device of claim 24 wherein the number of active and nulled tones being based on a nulling factor.

28. The wireless device of claim 25 wherein the sample clock rate is a down-clocked sample clock rate configured to reduce the transmission bandwidth by a factor of ten or more.

29. The wireless device of claim 25 wherein when the sample clock rate is down-clocked by up to one-tenth or more.

30. The wireless device of claim 24 wherein the reduced transmission bandwidth comprises bandwidths of 2 MHz, 4 MHz, 8 MHz or 16 MHz using sets of 52, 108, 234 and 468 tones, respectively.

* * * * *

UNITED STATES PATENT AND TRADEMARK OFFICE
CERTIFICATE OF CORRECTION

PATENT NO. : 9,537,699 B2
APPLICATION NO. : 14/719733
DATED : January 3, 2017
INVENTOR(S) : Kenney et al.

It is certified that error appears in the above-identified patent and that said Letters Patent is hereby corrected as shown below:

On the Title Page

In Column 2, under "Other Publications", Line 2, delete "mobilityand" and insert --mobility and--, therefor In Column 2, under "Other Publications", Line 3, delete "of fload"," and insert --offload",--, therefor In the Claims In Column 10, Line 36, in Claim 2, after "both", insert --the--

In Column 13, Line 23, in Claim 23, after "greater", insert --than--

Signed and Sealed this
Twenty-eighth Day of May, 2019

Andrei Iancu
*Director of the United States Patent and Trademark Office*